US010628733B2

United States Patent
Schaul et al.

(10) Patent No.: US 10,628,733 B2
(45) Date of Patent: Apr. 21, 2020

(54) SELECTING REINFORCEMENT LEARNING ACTIONS USING GOALS AND OBSERVATIONS

(71) Applicant: DeepMind Technologies Limited, London (GB)

(72) Inventors: Tom Schaul, London (GB); Daniel George Horgan, London (GB); Karol Gregor, London (GB); David Silver, Hitchin (GB)

(73) Assignee: DeepMind Technologies Limited, London (GB)

( * ) Notice: Subject to any disclaimer, the term of this patent is extended or adjusted under 35 U.S.C. 154(b) by 769 days.

(21) Appl. No.: 15/091,840

(22) Filed: Apr. 6, 2016

(65) Prior Publication Data

US 2016/0292568 A1 Oct. 6, 2016

Related U.S. Application Data

(60) Provisional application No. 62/143,677, filed on Apr. 6, 2015.

(51) Int. Cl.
*G06N 3/00* (2006.01)
*G06N 20/00* (2019.01)
(Continued)

(52) U.S. Cl.
CPC .............. *G06N 3/08* (2013.01); *G06N 3/0454* (2013.01); *G06N 20/00* (2019.01)

(58) Field of Classification Search
CPC ....... G06N 3/0454; G06N 3/08; G06N 99/005
See application file for complete search history.

(56) References Cited

U.S. PATENT DOCUMENTS

2012/0268580 A1* 10/2012 Kim ..................... G06F 3/017
348/77
2015/0100530 A1* 4/2015 Mnih ................... G06N 3/0454
706/25

OTHER PUBLICATIONS

Mnih et al., "Human-Level Control Through Deep Reinforcement Learning", Nature \, Feb. 26, 2015, vol. 528, pp. 529-533 (Year: 2015).*

(Continued)

*Primary Examiner* — Robert A Cassity
*Assistant Examiner* — Robert Lewis Kulp
(74) *Attorney, Agent, or Firm* — Fish & Richardson P.C.

(57) ABSTRACT

Methods, systems, and apparatus, including computer programs encoded on computer storage media, for reinforcement learning using goals and observations. One of the methods includes receiving an observation characterizing a current state of the environment; receiving a goal characterizing a target state from a set of target states of the environment; processing the observation using an observation neural network to generate a numeric representation of the observation; processing the goal using a goal neural network to generate a numeric representation of the goal; combining the numeric representation of the observation and the numeric representation of the goal to generate a combined representation; processing the combined representation using an action score neural network to generate a respective score for each action in the predetermined set of actions; and selecting the action to be performed using the respective scores for the actions in the predetermined set of actions.

20 Claims, 4 Drawing Sheets

(51) Int. Cl.
G06N 3/04 (2006.01)
G06N 3/08 (2006.01)

(56) References Cited

OTHER PUBLICATIONS

Sutton et al., "Horde: A scalable Real-time Architecture for Learning Knowledge from Unsupervised Sensormotor Interaction", Proc. of 10th Int. Conf on Autonomous Agent and Multiagent Systems, May 2-6, 2011, pp. 761-768 (Year: 2011).*
Singh et al., "Intrinsically Motivated Reinforcement Learning", NIPS 2005 (Year: 2005).*
Ni et al. ("Goal Representation Heuristic Dynamic Programming on Maze Navigation," IEEE Trans. Neural Networks and Learning Systems, vol. 24, No. 12, Dec. 2013, pp. 2038-2050) (Year: 2013).*
Ni et al ("GrDHP: A General Utility Function Representation for Dual Heuristic Dynamic Programming", IEEE Transactions on Neural Networks and Learning Systems, vol. 26, No. 3, Mar. 2015, pp. 614-627) (Year: 2015).*
Crabbe et al. ("Goal Directed Adaptive Behavior in Second-Order Neural Networks: The MAXSON Family or Architectures", Adaptive Behavior, 2000, 8(2), pp. 149-172) (Year: 2000).*
Ngiam et al. ("Multimodal Deep Learning", International Conference on Machine Learning, 2011, pp. 1-9) (Year: 2011).*
Socher et al. ("Zero-Shot Learning Through Cross-Modal Transfer", NIPS 2013, pp. 1-10) (Year: 2013).*
Levy et al. ("Neural Word Embedding as Implicit Matrix Factorization", Neural Information Processing Systems, 2014, pp. 1-9) (Year: 2014).*
Sutton et al. ("Horde: A Scalable Real-time Architecture for Learning Knowledge from Unsupervised Sensorimotor Interaction", Proc. of 10th Int. Conf. on Autonomous Agent and Multiagent Systems (AAMAS 2011), May 2-6, 2011, pp. 761-768) (Year: 2011).*
Sutton et al. ("Reinforcement Learning: An Introduction", MIT Press, Cambridge, MA, 1998) (Year: 1998).*
Shin et al ("Reinforcement learning approach to goal-regulation in a self-evolutionary manufacturing system", Expert Systems with Application 29 (2012) (Year: 2012).*
Crabbe et al. "Goal Directed Adaptive Behavior in Second-Order Neural Networks: The MAXSON family of architectures," Adaptive Behavior, Mar. 2000, 24 pages.
Extended European Search Report issued in European Application No. 16164072.7, dated Feb. 23, 2017, 9 pages.
Mnih et al. "Human-level control through deep reinforcement learning," Nature, vol. 518 (7450) Feb. 25, 2015, 13 pages.
Qiao et al. "Q-Learning Based on Neural Networks in Learning Action Selection of Mobile Robot," IEEE International Conference on Automation and Logistics, Aug. 2007, 5 pages.
Schaul et al. "Universal Value Function Approximators," vol. 37: Proceedings of the 32nd International Conference on Machine Learning, Jul. 11, 2015, 9 pages.
Tham "Reinforcement learning of multiple tasks using a hierarchical CMAC architecture," Robotics and Autonomous Systems, Elsevier Science Publishers, vol. 15(4), Oct. 1995, 28 pages.
Foster and Dayan, "Structure in the Space of Value Functions," Machine Learning, 2002, 49(2-3):325-346.
Modayil et al., "Multi-timescale Nexting in a Reinforcement Learning Robot," Adaptive Behavior, 2014, 22(2):146-160.
Schaul and Ring, "Better Generalization with Forecasts," In Proceedings of the 23rd International Joint Conference on Artificial Intelligence, AAAI Press, 2013, pp. 1656-1662.
Sutton et al., "Between MDPs and Semi-MDPs: A Framework for Temporal Abstraction in Reinforcement Learning," Artificial Intelligence, 1999, 112:181-211.
Sutton et al., "Horde: A Scalable Real-time Architecture for Learning Knowledge from Unsupervised Sensorimotor Interaction," In the 10th International Conference on Autonomous Agents and Multiagent Systems, 2011, 2:761-768.
Sutton and Tanner, "Temporal-difference Networks," Advances in Neural Information Processing Systems, 2005, MIT Press, pp. 1377-1384.

* cited by examiner

SELECTING REINFORCEMENT LEARNING ACTIONS USING GOALS AND OBSERVATIONS

CROSS-REFERENCE TO RELATED APPLICATION

This application claims priority to U.S. Provisional Application No. 62/143,677, filed on Apr. 6, 2015. The disclosure of the prior application is considered part of and is incorporated by reference in the disclosure of this application.

BACKGROUND

This specification relates to selecting actions to be performed by a reinforcement learning agent.

Reinforcement learning agents interact with an environment by receiving an observation that characterizes the current state of the environment, and in response, performing an action from a predetermined set of actions. Some reinforcement learning agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. A reinforcement learning system can effectively and directly consider target states that a reinforcement agent is attempting to reach in selecting actions to be performed by the agent in response to received observations. Additionally, the reinforcement learning system can effectively select actions for goals that were not encountered during learning. In selecting actions, the reinforcement learning system can take advantage of a shared structure between the space of goals and the space of observations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order to interact with the environment, the agent receives data characterizing the current state of the environment and selects an action from a predetermined set of actions to be performed in response to the received data. Data characterizing a state of the environment will be referred to in this specification as an observation.

In particular, the agent interacts with the environment to attempt to reach a predetermined set of target states of the environment. Data characterizing a state from the set of target states will be referred to in this specification as a goal. For example, when the environment is a video game and the agent is a computer program interacting with the video game, each target state can be a waypoint during game play of the videogame, e.g., a state representing an end of a level or a state in which a specific item necessary to gameplay is collected or a piece of information is revealed. As another example, when the environment is a real-world environment and the agent is a robot interacting with the environment to accomplish a specific task, each target state can be a state in which a subtask has been completed by the robot, e.g., when the robot has moved an item from one location to another or has otherwise made progress toward completing the task.

Figure 1:
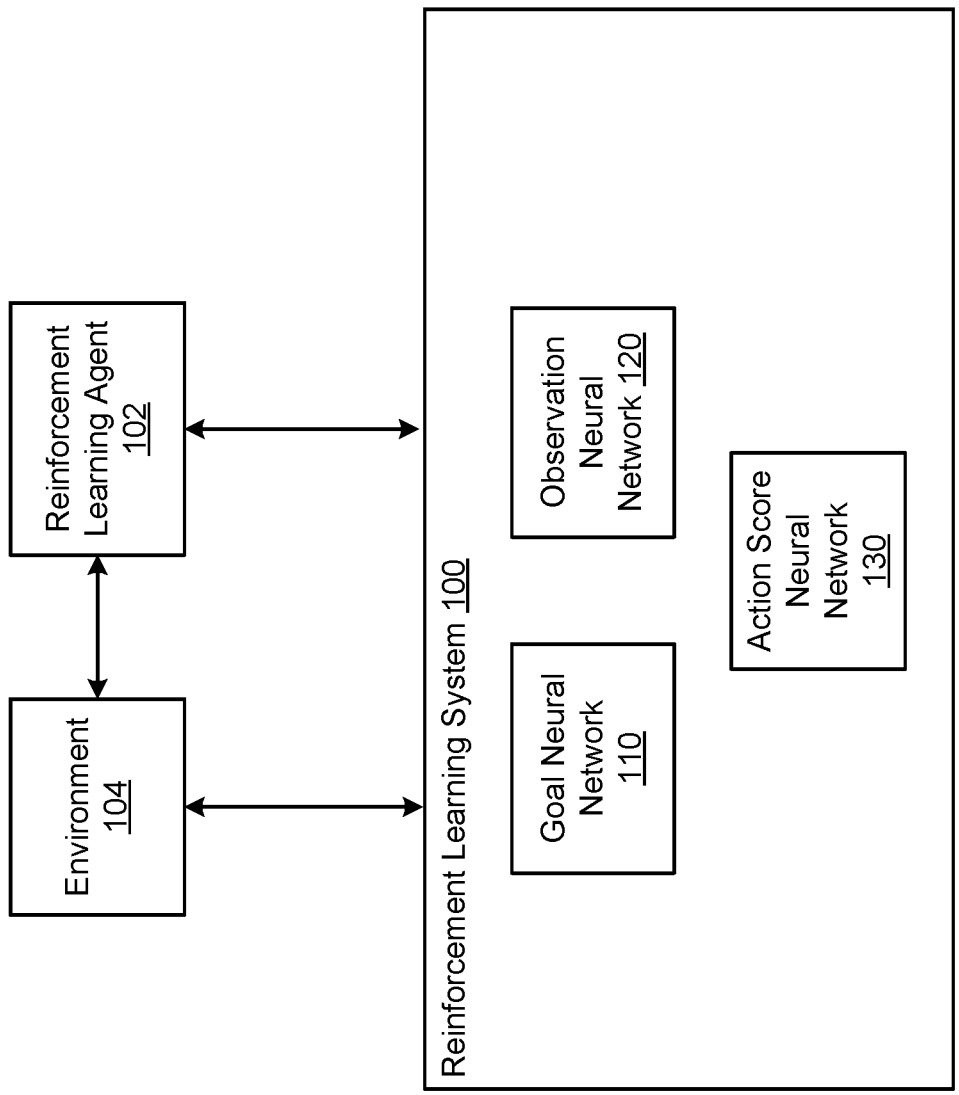
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 is a universal value function approximator (UVFA) that generalizes over states and goals to select actions to be performed by a reinforcement learning agent 102 interacting with an environment 104. In particular, the reinforcement learning system 100 receives observations, with each observation characterizing a state of the environment 104, and, in response to each observation, selects an action from a predetermined set of actions to be performed by the reinforcement learning agent 102.

In particular, the reinforcement learning system 100 selects actions using a goal neural network 110, an observation neural network 120, and an action score neural network 130.

The goal neural network 110 is a neural network that is configured to receive a goal and to process the goal to generate a numeric representation of the goal. The numeric representation of the goal is a vector from an n-dimensional vector space of embeddings.

The observation neural network 120 is a neural network that is configured to receive an observation to generate a numeric representation of the observation. The numeric representation of the observation is also vector from the n-dimensional vector space of embeddings.

In some implementations, the observation neural network 120, the goal neural network 110, or both, are multi-layer perceptron (MLP) neural networks.

Additionally, in some implementations, the observation neural network 120 and the goal neural network 110 share one or more parameters. For example, the parameters of the first layer of the observation neural network 120 and the goal neural network 110 may be shared.

In some implementations, the action score neural network 130 is a neural network that is configured to receive a combined representation of a goal and an observation and to generate a respective score for each action in the set of actions.

In some other implementations, the action score neural network 130 is a neural network that is configured to receive a combined representation and an action and to generate a score for the action.

Selecting an action using the goal neural network 110, the observation neural network 120, and the action score neural network 130 will be described in more detail below with reference to FIG. 2.

The combined representation is generated by the reinforcement learning system 100 from the numeric representation of the goal and the numeric representation of the observation. In some implementations, to generate the combined representation, the system maps the n-dimensional goal representation and the n-dimensional observation representation to a scalar value to generate the combined representation. Generating a combined representation will be described in more detail below with reference to FIG. 3.

Figure 2:
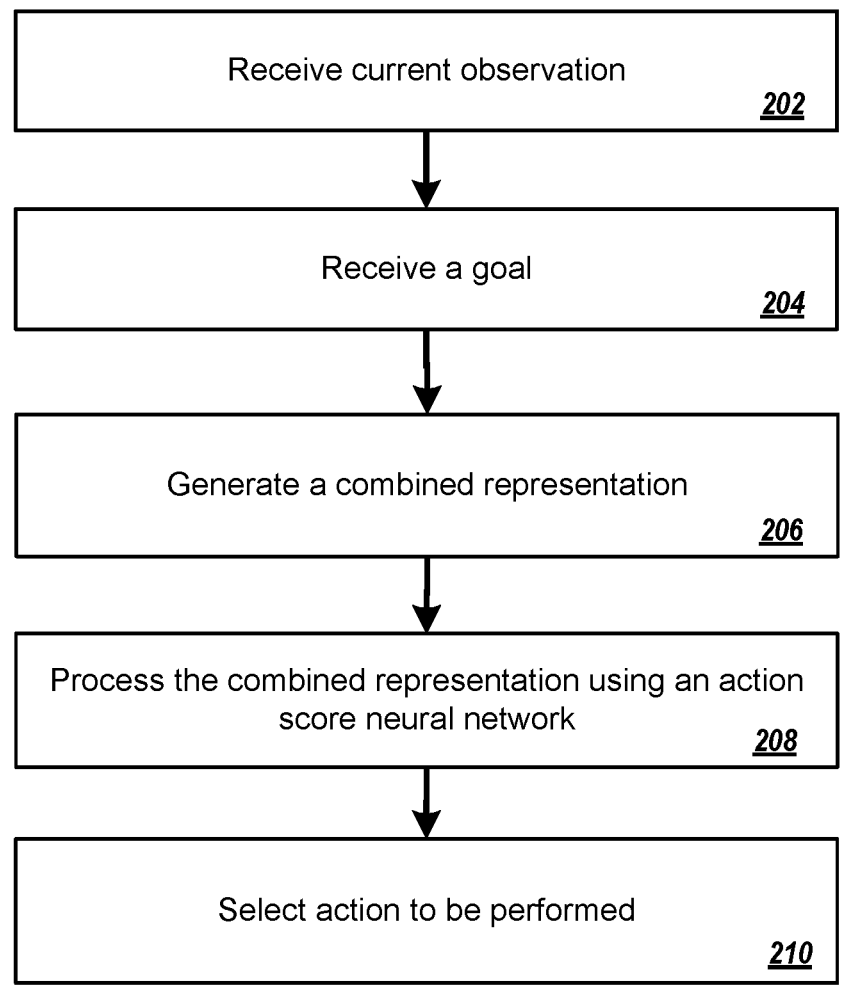
FIG. 2 is a flow diagram of an example process for selecting an action in response to a received observation.

FIG. 2 is a flow diagram of an example process 200 for selecting an action in response to a received observation. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives an observation characterizing the current state of the environment (step 202).

The system receives a goal characterizing a target state from a set of target states of the environment (step 204). In some implementations, the system provides an interface that allows a user to select a target state. Once selected, a goal characterizing the target state will be used by system in selecting actions to be performed by the agent until the user switches the target state through the interface. In other implementations, the system receives the state from another system, e.g., a system that selects the target state to be reached from the set of target states, e.g., using a policy that selects the target state based on the current observation.

The system generates a combined representation of the observation and of the goal (step 206). Generating the combined representation is described in more detail below with reference to FIG. 3.

The system generates a respective score for each action in the set of actions from the combined representation by processing the combined representation using an action score neural network (step 208).

In implementations where the action score neural network is configured to receive as input a combined representation and to process the combined representation to generate a respective score for each action in the set, the system processes the combined representation using the action score neural network to generate the respective scores.

In implementations where the action score neural network is configured to receive as input a combined representation and an action and to process the combined representation and the action to generate a score for the action, for each action in the set of actions, the system processes the action and the combined representation using the action score neural network to generate the respective score for the action.

The system selects the action to be performed by the agent in response to the observation using the respective scores for the actions in the predetermined set of actions (step 210).

In some cases, the system selects the highest-scoring action, i.e., the action having the highest score of any of the actions in the set of actions, as the action to be performed by the agent.

In some other cases, e.g., during learning, the system may at times select an action other than the highest-scoring action as the action to be performed. For example, during learning the system may select a random action from the set of actions with probability ε and select the highest-scoring action with probability 1−ε.

Figure 3:
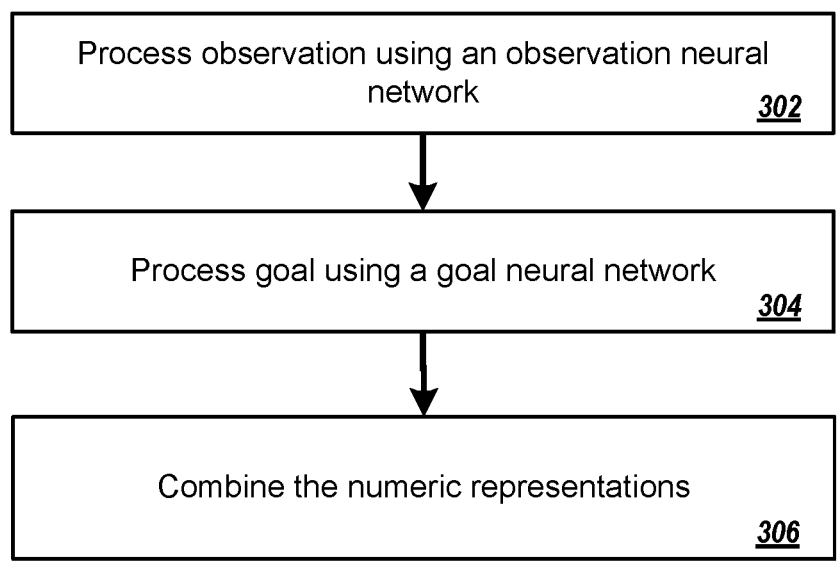
FIG. 3 is a flow diagram of an example process for generating a combined representation of a goal and an observation.

FIG. 3 is a flow diagram of an example process 300 for generating a combined representation of a goal and an observation. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system processes the observation using the observation neural network to generate a numeric representation of the observation (step 302).

The system processes the goal using the goal neural network to generate a numeric representation of the goal (step 304).

The system generates a combined representation from the numeric representation of the observation and the numeric representation of the goal (step 306).

The system may generate the combined representation from the numeric representations of the observation and of the goal in any of a variety of ways.

For example, the system may generate the combined representation by computing a dot product between the numeric representation of the observation and the numeric representation of the goal.

As another example, the system may generate the combined representation by processing the numeric representation of the observation and the numeric representation of the goal using a combining neural network that is configured to receive the numeric representation of the observation and the numeric representation of the goal and process the numeric representation of the observation and the numeric representation of the goal to generate the combined representation.

To determine trained values of the parameters of the observation neural network, the goal neural network, the action score neural network and, optionally, the combining neural network, the system trains the observation neural network, the goal neural network, the action score neural network and, optionally, the combining neural network.

In some implementations, the system directly trains the neural networks jointly using an end-to-end training procedure, i.e., by obtaining labeled training data and performing a neural network training technique, e.g., stochastic gradient descent, to backpropagate errors from the action score neural network through the observation neural network and the goal neural network.

In some other implementations, the system trains the neural networks using a two-stage training procedure based on matrix factorization.

Figure 4:
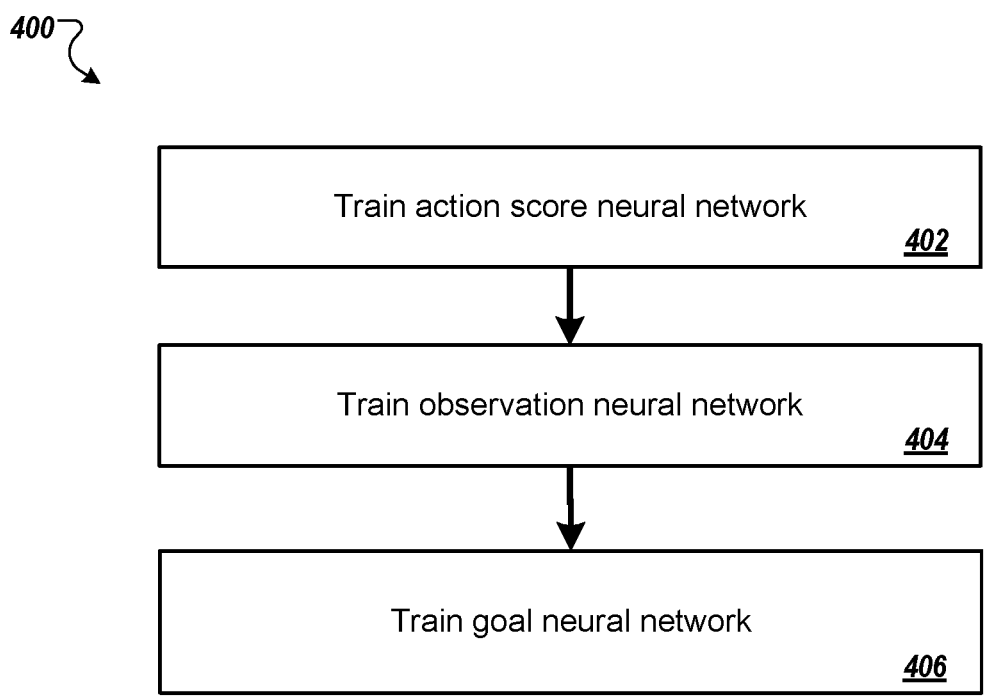
FIG. 4 is a flow diagram of an example process for training an action score neural network, a goal neural network, and an observation neural network.

FIG. 4 is a flow diagram of an example process 400 for training an action score neural network, a goal neural network, and an observation neural network. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system trains the action score neural network to determine trained values of the parameters of the action score neural network and to determine idealized goal embeddings and idealized observation embeddings (step 402).

In some implementations, the system determines targets for the training of the action score neural network using a Horde architecture. In a Horde architecture, a different neural network is maintained for each goal from the set of goals. The neural network for each goal generates action scores based on received observations. The system trains each of the neural networks in the Horde independently and off policy using conventional reinforcement learning techniques. An example Horde architecture and example techniques for learning the neural networks in the Horde are described in more detail in Sutton, Richard S, Modayil, Joseph, Delp, Michael, Degris, Thomas, Pilarski, Patrick M, White, Adam, and Precup, Doina. *Horde: A scalable real-time architecture for learning knowledge from unsupervised sensorimotor interaction*. In The 10th International Conference on Autonomous Agents and Multiagent Systems-Volume 2, pp. 761-768, 2011.

Once the neural networks in the Horde have been learned, the system can determine targets for the training of the action score neural network, i.e., action scores that should be generated by the action score neural network, based on the outputs of the learned neural networks in the Horde. The system then trains the action score neural network on the targets determined from the Horde using neural network training techniques, e.g., stochastic gradient descent.

In some other implementations, the system determines targets for the training of the action score neural network by bootstrapping from the next states in visited transitions for each goal in a training set, e.g., using a variant of a Q-learning technique.

To determine the idealized goal embeddings and the idealized observation embeddings, the system generates a data matrix with one row corresponding to each observation encountered during the training of the action score neural network and one column corresponding to each goal encountered during the training of the action score neural network. The entries in the matrix are the target action scores for the corresponding goal, observation combination. The system then factorizes the matrix to determine a low-rank approximation that defines the embedding spaces for both states and goals.

The system trains the goal neural network on the idealized goal embeddings (step 404). That is, the system trains the goal neural network to generate numeric representations that match the idealized goal embeddings using conventional techniques.

The system trains the observation neural network on the idealized observation embeddings (step 406). That is, the system trains the observation neural network to generate numeric representations that match the idealized observation embeddings using conventional techniques.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for selecting an action to be performed by a reinforcement learning agent that interacts with an environment by receiving observations characterizing a current state of the environment and, in response, performing actions from a predetermined set of actions, wherein the method comprises:
   receiving an observation characterizing a current state of the environment;
   receiving, from a user or from an external system, an input identifying a target state from a set of target states of the environment that is different from the current state of the environment characterized by the observation, wherein the target state is a state to be reached by the reinforcement learning agent by interacting with the environment;

generating a goal that corresponds to the target state identified in the input received from the user or from the external system; and processing the goal and the observation using a universal value function approximator (UVFA) that generalizes over states and goals in order to select an action to be performed by the reinforcement learning agent in order to reach the provided target state in response to the observation based on the observation and the generated goal, comprising:

processing the observation using an observation neural network to generate a numeric representation of the observation;

processing the goal using a goal neural network to generate a numeric representation of the goal;

combining the numeric representation of the observation and the numeric representation of the goal to generate a combined representation of the observation and the goal;

processing the combined representation of the observation and the goal using an action score neural network to generate a respective score for each action in the predetermined set of actions; and selecting the action to be performed using the respective scores for the actions in the predetermined set of actions.

2. The method of claim 1, wherein the action score neural network is configured to receive as input the combined representation and to process the combined representation to generate the respective score for each action in the predetermined set of actions.

3. The method of claim 1, wherein the action score neural network is configured to receive as input the combined representation and an action from the predetermined set of actions and to process the combined representation and the received action to generate a score for the action, and wherein processing the combined representation using the action score neural network comprises, for each action in the predetermined set of actions:

processing the action and the combined representation using the action score neural network to generate the respective score for the action.

4. The method of claim 1, wherein selecting the action to be performed comprises:
selecting a highest-scoring action.

5. The method of claim 1, wherein selecting the action to be performed comprises:
selecting a random action from the set of actions with probability ε; and
selecting a highest-scoring action with probability 1-ε.

6. The method of claim 1, wherein the observation neural network is a multi-layer perceptron (MLP) neural network.

7. The method of claim 6, wherein the goal neural network is a multi-layer perceptron (MLP) neural network.

8. The method of claim 1, wherein the goal neural network and the observation neural networks share one or more parameters.

9. The method of claim 1, wherein the combined representation is a dot product of the numeric representation of the observation and the numeric representation of the goal.

10. The method of claim 1, wherein combining the numeric representation of the observation and the numeric representation of the goal to generate the combined representation comprises:

processing the numeric representation of the observation and the numeric representation of the goal using a combining neural network to generate the combined representation.

11. The method of claim 1, further comprising:
training the action score neural network, the observation neural network, and the goal neural network.

12. The method of claim 11, wherein the training comprises:
training the action score neural network to determine trained goal embeddings and trained observation embeddings;
training the observation neural network on the trained observation embeddings; and
training the goal neural network on the trained goal embeddings.

13. The method of claim 12, wherein training the action score neural network comprises determining the trained goal embeddings and trained observation embeddings using a matrix factorization technique.

14. The method of claim 12, wherein the action score neural network is trained to generate action scores that match a set of target action scores, and wherein the target action scores for the training of the action score neural network are determined by learning a separate action score neural network for each goal in the predetermined set of goals.

15. The method of claim 12, wherein the action score neural network is trained to generate action scores that match a set of target action scores, and wherein the target action scores for the training of the action score neural network are determined by bootstrapping from the states in visited transitions for each goal in a training set.

16. The method claim 1, further comprising:
providing an interface for selecting target states, such that a selected goal is used in selecting actions to be performed until the selected goal is switched through the interface.

17. A system comprising one or more computers and one or more storage devices storing instructions that, when executed by the one or more computers, cause the one or more computers to perform operations for selecting an action to be performed by a reinforcement learning agent that interacts with an environment by receiving observations characterizing a current state of the environment and, in response, performing actions from a predetermined set of actions, the operations comprising:

receiving an observation characterizing a current state of the environment;

receiving, from a user or from an external system, an input identifying a target state from a set of target states of the environment that is different from the current state of the environment characterized by the observation, wherein the target state is a state to be reached by the reinforcement learning agent by interacting with the environment;

generating a goal that corresponds to the target state identified in the input received from the user or from the external system; and processing the goal and the observation using a universal value function approximator (UVFA) that generalizes over states and goals in order to select an action to be performed by the reinforcement learning agent in order to reach the provided target state in response to the observation based on the observation and the generated goal, comprising:

processing the observation using an observation neural network to generate a numeric representation of the observation;

processing the goal using a goal neural network to generate a numeric representation of the goal;

combining the numeric representation of the observation and the numeric representation of the goal to generate a combined representation of the observation and the goal;

processing the combined representation of the observation and the goal using an action score neural network to generate a respective score for each action in the predetermined set of actions; and selecting the action to be performed using the respective scores for the actions in the predetermined set of actions.

18. The system of claim 17, wherein the action score neural network is configured to receive as input the combined representation and to process the combined representation to generate the respective score for each action in the predetermined set of actions.

19. The system of claim 17, wherein the action score neural network is configured to receive as input the combined representation and an action from the predetermined set of actions and to process the combined representation and the received action to generate a score for the action, and wherein processing the combined representation using the action score neural network comprises, for each action in the predetermined set of actions:

processing the action and the combined representation using the action score neural network to generate the respective score for the action.

20. One or more non-transitory storage media storing instructions that, when executed by one or more computers, cause the one or more computers to perform operations for selecting an action to be performed by a reinforcement learning agent that interacts with an environment by receiving observations characterizing a current state of the environment and, in response, performing actions from a predetermined set of actions, the operations comprising:

receiving an observation characterizing a current state of the environment;

receiving, from a user or from an external system, an input identifying a target state from a set of target states of the environment that is different from the current state of the environment characterized by the observation, wherein the target state is a state to be reached by the reinforcement learning agent by interacting with the environment;

generating a goal that corresponds to the target state identified in the input received from the user or from the external system; and processing the goal and the observation using a universal value function approximator (UVFA) that generalizes over states and goals in order to select an action to be performed by the reinforcement learning agent in order to reach the provided target state in response to the observation based on the observation and the generated goal, comprising:

processing the observation using an observation neural network to generate a numeric representation of the observation;

processing the goal using a goal neural network to generate a numeric representation of the goal;

combining the numeric representation of the observation and the numeric representation of the goal to generate a combined representation of the observation and the goal;

processing the combined representation of the observation and the goal using an action score neural network to generate a respective score for each action in the predetermined set of actions; and selecting the action to be performed using the respective scores for the actions in the predetermined set of actions.

* * * * *